United States Patent Office 3,715,403
Patented Feb. 6, 1973

---

3,715,403
SEPARATION OF ALPHA-NAPHTHOL
Joost Manassen, David Vofsi, and Michael Martan, Rehovot, Israel, assignors to Yeda Research and Development Co., Ltd., Rehovot, Israel
No Drawing. Filed Dec. 19, 1968, Ser. No. 785,349
Claims priority, application Israel, Dec. 19, 1967, 29,164
Int. Cl. C07c *37/44*
U.S. Cl. 260—621 A                          7 Claims

ABSTRACT OF THE DISCLOSURE

A process for the separation and recovery of α-naphthol from mixtures thereof with α-tetralone, which comprises extracting such mixtures with an aqueous ammonia or lower alkylamine first extractant and a low boiling aliphatic hydrocarbon second extractant. The α-naphthol is substantially recovered in the aqueous nitrogen compound extractant-containing phase, and may suitably be separated therefrom by evaporation of the low boiling solvent. The separation may suitably be carried out employing countercurrent extraction techniques.

BACKGROUND OF THE INVENTION

(1) Field of the invention

This invention relates to the separation of α-naphthol from mixtures of the same with α-tetralone, and particularly from such mixtures resulting from the dehydrogenation of α-tetralone which may contain, in addition to the α-naphthol and α-tetralone, minor proportions of naphthalene or the like.

(2) Description of the prior art

Various procedures have been proposed for effecting the separation of α-naphthol from admixture with α-tetralone. None of such previously known techniques have, however, been entirely satisfactory due to a combination of technical and economic factors. Thus, on the technical side it is not possible to effect complete separation of α-naphthol from α-tetralone by simple distillation since such materials form an azeotrope having a 3:1 naphthol:tetralone ratio. Furthermore, separations at elevated temperatures are complicated by the fact that the α-tetralone tends to decompose when maintained at such temperatures for prolonged periods of time. On the other hand, those procedures which have heretofore been developed and which effect adequate separation of the two species are generally relatively complex and, hence, economically unattractive.

Processes for the separation of α-naphthol from admixture with α-tetralone by the addition of aqueous caustic soda to the mixture to be separated are known. The α-naphthol is thus transferred to the aqueous phase as naphtholate and may subsequently be precipitated by the addition of acid. Such process is, however, relatively uneconomical in view of the necessity to employ quantities of base and acid each of which are equivalent to the amount of α-naphthol to be separated by the multi-step operation.

British Pat. No. 1,016,977 describes a further technique for recovering α-naphthol from such mixtures. Employing such technique one must utilize two crystallization operations to obtain the desired α-naphthol in substantially pure form. Moreover, it is frequency necessary to initially enrich the α-naphthol content of the mixture to be separated (as by distillation), prior to carrying out the multiple crystallization operations taught by such patent.

Processes are also known for effecting the desired separation by extractive distillation operations. Such processes as described for example in U.S. Pat. No. 3,105,018 granted Sept. 24, 1963, are both complex and expensive. Accordingly, the use of these techniques in large scale commercial operations is relatively unsatisfactory.

It is, accordingly, among the objects of the present invention to provide an improved process for the separation of α-naphthol from mixtures with α-tetralone, which process provides efficient separation of the respective materials in substantially pure form and on an economically attractive basis. Other objects and advantages of the invention will be apparent from the following description of preferred embodiments thereof.

SUMMARY OF THE INVENTION

In accordance herewith α-naphthol is separated from mixtures of such material with α-tetralone by extraction with a first extractant comprising an aqueous solution of ammonia or a lower alkylamine, and a second low boiling, substantially saturated aliphatic hydrocarbon solvent extractant. The first, nitrogen compound-containing solvent forms a first, aqueous phase into which the bulk of the α-naphthol is extracted, while the low boiling aliphatic hydrocarbon solvent forms a second, organic phase incorporating the bulk of the α-tetralone and any other organic constituents of the initial mixture treated. Employing multiple extraction and wash operations and/or continuous countercurrent contact techniques, in a manner well known in the art, it has been found possible to remove substantially all of the α-naphthol constituent from admixture with the α-tetralone in the residual organic phase. The α-naphthol may be readily separated and recovered from the resulting aqueous phase by evaporation of the nitrogen compound-containing solvent thereof and crystallization of the α-naphthol product.

This technique facilitates the efficient and yet relatively simple separation of α-naphthol from mixtures containing tetralone, naphthalene or similar materials, e.g., the synthesis mixture resulting from dehydrogenation of α-tetralone. Such technique is readily applicable to either batch or continuous operations and may be utilized in large scale commercial production at relatively low cost. Thus, the dual solvent extraction process of the present invention affords an efficient and convenient mode for separating α-naphthol from its synthesis mixtures and providing such materials in substantially pure form for subsequent application.

PREFERRED EMBODIMENTS OF THE INVENTION

The nitrogen compound solvent utilized as the first extractant in accordance with the invention may be an aqueous solution of ammonia or any suitable lower alkylamine, viz, a primary, secondary or tertiary alkylamine having from 1 to 4 carbon atoms in each of its alkyl moieties. Compounds having the formula $NR_1R_2R_3$, wherein $R_1$, $R_2$ and $R_3$ are either hydrogen or $C_nH_{2n+1}$, in which $n$ is 1 to 4 may thus be employed. Materials so useful include, in addition to ammonia, methylamine, ethylamine, n-propylamine and like materials which, preferably, have boiling points below about 85° C.

The use of aqueous ammonia as the first extractant is particularly suitable, 25% ammonia solutions, for example, serving as excellent extractants at standard conditions of temperature and pressure (e.g., at temperatures of from about 20° to 25° C. and pressures of about 1 atmosphere). Higher ammonia concentrations may be utilized, when carrying out the extraction at lower temperatures or under higher pressures. In passing, it is noted that all parts and percentages specified above, or referred to hereinafter, are given by weight, unless otherwise indicated.

Alternatively, aqueous solutions of the lower alkylamines, preferably methylamine, may be substituted for the aqueous ammonia extractant, with the use of lower concentrations than those required employing the latter material. The use of the lower alkylamine extractants rather than ammonia is, however, somewhat less satisfactory, the alkylamines being less volatile than ammonia (and thus making it somewhat more difficult to recover the α-naphthol product from the aqueous extract) and relatively more expensive than the ammonia extractant.

The second extractant is, as noted above, a low boiling (viz, boiling at below about 125° C.), substantially saturated aliphatic hydrocarbon solvent. Materials so useful include acyclic aliphatics such as propane, butane, hexane and, preferably, petroleum fractions (petroleum ethers) boiling at temperatures between about 30° and 85° C., particularly such fractions boiling at temperatures between about 40° and 65° C. Higher boiling petroleum fractions, which may contain substantial proportions of aryl constituents, are not similarly useful for the purposes of the present invention, the presence of even as much as about 10% benzene in the petroleum fraction solvent having been found to substantially impair the desired separation of the α-naphthol.

The second extractant may, alternatively, comprise low boiling (viz, boiling at temperatures of less than about 125° C.) cycloparaffins including, for example, cyclobutane, cyclopentane and, preferably, cyclohexane. As in the case of the acyclic hydrocarbon solvent extractants it is important that, when utilizing such materials or mixtures thereof, the proportion of aromatic constituents admixed therewith be minimized to avoid dissolving substantial proportions of the α-naphthol in the organic extract phase.

The proportions of α-naphthol and α-tetralone incorporated in the mixtures treated in accordance with the present invention may vary within a wide range. Generally, however, the amount of the α-naphthol present in the synthesis mixtures formed by catalytic dehydrogenation of the α-tetralone varies from about 30% to about 75% of the mixture. It has been found that the proportions of the first and second extractants utilized to separate α-naphthol from such mixtures similarly vary widely, depending upon the ratio of α-naphthol to α-tetralone in the mixture to be separated, the compositions of the particular first and second extractants utilized, the temperature and pressure conditions in which the dual solvent extraction is carried out, and the degree of separation desired per reaction stage. Such proportions may readily be determined on an empirical basis. Thus, it will be understood that the present invention is not limited to the use of any particular proportions or amounts of the first and second extractants for separating the α-naphthol from the α-tetralone-containing synthesis mixtures in which such is formed.

The dual solvent extraction is preferably carried out under atmospheric conditions, viz, at temperatures of from about 20° to 25° C. and under pressures of about 1 atmosphere. Decreased reaction temperatures and/or increased pressures may, however, be utilized when it is desired to employ higher concentrations of the aqueous ammonia extractant or, alternatively, to utilize other extractants, e.g., n-butane, which are in gaseous form at standard temperatures and pressures. The choice of optimum separation temperatures and pressures thus depend upon the particular extractants to be utilized for effecting the desired separation.

The α-naphthol may be separated by any suitable single or multi-stage extraction operations, utilizing either conventional batch or continuous techniques. Thus, the mixture of α-naphthol and α-tetralone to be treated may initially be contacted with either of the first or second extractants, followed by extraction and/or washing with the other such extractant. Alternatively, and preferably, the feed mixture is simultaneously contacted with both such extractants employing, for example, a dual solvent counter-current extraction technique such as described in Chapter V of "Liquid-Liquid Extraction," L. Alders (1959). Such technique uses two solvents whose mutual solubility is low and in either of which the substance to be separated is preferentially soluble, and the solvents generally pass the entire extraction system countercurrently.

Utilizing the last mentioned technique the desired separation may suitably be carried out by feeding the first nitrogen compound-containing aqueous extractant, e.g., aqueous ammonia, into the upper portion of a suitable extraction zone while simultaneously feeding the second, aliphatic hydrocarbon solvent extractant, e.g., cyclohexane, into the lower portion of such zone. The α-naphthol-α-tetralone mixture may be introduced at any intermediate point, the heavier aqueous extractant passing downwardly through the extraction tower into contact with the feed stream, and the lighter organic extractant passing upwardly through the tower into contact with such feed. The heavier aqueous solvent stream forms an extract phase incorporating the bulk of the desired α-naphthol product and being recovered from the base of the extraction zone, while the lighter hydrocarbon solvent stream acts as a wash solvent forming an organic or raffinate phase incorporating substantially all of the α-tetralone and other organic constituents and being recovered from the top of the extraction zone. The dual solvent extractor thus employed incorporates both extraction and wash stages such as illustrated, for example, in figure 80 on page 136 of the aforesaid work, "Liquid-Liquid Extraction," L. Alders, 1959.

The following examples illustrate different modes for effecting the dual solvent extraction process of the present invention. The examples represent laboratory experiments intended to simulate dual solvent, countercurrent extractions employing (a) plural stage mixers and settlers, or (b) extraction towers.

EXAMPLE 1

Plural stage extraction with ammonia and cyclohexane

A mixture containing 42% α-naphthol, 42% α-tetralone, and the balance naphthalene, 1,2-dihydronaphthalene, 1,4-dihydronaphthalene and tetralone, was extracted by sequential treatment in separating funnels as described in Chapters V.8 and IV.11 of the aforesaid text, "Liquid-Liquid Extraction," L. Alders, 1959. Thus, feed and solvent are added to a first funnel which is shaken vigorously at the extraction temperature. The phases are allowed to settle and the extract phase drawn off. The co-existing raffinate or wash phase is transferred to a second funnel and similarly treated with solvent. The resulting extract phase is treated in the first funnel with a fresh quantity of feed, its co-existing phase in a third funnel with fresh solvent, and so on.

The extraction was carried out employing three extraction stages and two wash stages, each of which was maintained at room temperature (about 23° C.). Feed portions (1.2 ml.) of the mixture to be fractionated were utilized and extracted with portions (15 ml.) of a 25% aqueous ammonia extractant and portions (10 ml.) of a second cyclohexane extractant.

The ammonia was removed from the final aqueous extract phase by slightly elevating the temperature thereof at reduced pressure until the pH of the solution dropped below 7.0, the α-naphthol precipitating therefrom in the form of white crystals (M.P. 95° C.). The α-tetralone and other organic constituents were recovered from the final cyclohexane wash phase after evaporation of the cyclohexane therefrom.

EXAMPLE 2

Plural stage extraction with ammonia and a petroleum ether

The plural stage extraction technique of Example 1 was repeated, utilizing an initial feed mixture containing 34.4% α-naphthol, 31% α-tetralone, and 31.6% other organic impurities.

The solvent used for extracting the α-naphthol was 25% aqueous ammonia, used in portions of 15 ml.; the wash solvent was a petroleum ether, boiling within the range of from 45° to 60° C. (30 ml. portions). The feed portions were 1.5 ml. and 2 extraction and 2 wash stages were employed, as described above, at 20°–23° C. The α-naphthol was obtained free of impurities in the aqueous ammonia phase, the organic petroleum ether phase containing the other constituents admixed with a minor proportion of α-naphthol.

EXAMPLE 3

Simultaneous extraction with ammonia and a petroleum ether 2 g. α-naphthol, 2 g. α-tetralone and 36 ml. petroleum ether (B.P. 40–65° C.) were introduced into a pressure vessel. An ammonia solution (40 ml.) was saturated at 0° C. and added to the aforesaid mixture. The vessel was closed and allowed to warm to room temperature. The pressure rose to about 3.5 kg./cm.$^2$. After shaking and separation into two phases, the organic, petroleum ether-containing layer was analyzed by gas chromatography and found to contain 90% of the α-tetralone and about 10% of the α-naphthol. On further extraction of the organic layer with 20 ml. ammonia, α-naphthol was completely removed without any further decrease in the α-tetralone content.

EXAMPLE 4

Simultaneous extraction with methylamine and a petroleum ether 2 g. α-naphthol, 2 g. α-tetralone, 36 ml. petroleum ether (boiling range 65°–85° C.) and 10 ml. of a 20% solution of methylamine in water were shaken in a separating funnel. After separation, the organic layer contained 33% of the α-naphthol and 70% of the α-tetralone. After a second extraction with 5 ml. of the aqueous methylamine solution, the α-naphthol content in the organic phase decreased to 20% and the α-tetralone to about 67%. After a third extraction with 5 ml. of the amine solution, only 9% of the α-naphthol remained in the organic phase while there was no increase in the amount of α-tetralone in the aqueous phase.

EXAMPLE 5

Simultaneous extraction with ammonia and a petroleum ether 2 g. α-naphthol, 2 g. α-tetralone, 36 ml. petroleum ether (boiling range 40°–65° C.) and 40 ml. aqueous ammonia were introduced into a round bottom flask which was cooled in an ice bath. Gaseous ammonia was bubbled through the mixture at 0° C. until the mixture was saturated. Analysis of the organic layer showed that 89% of the α-naphthol and 17% of the α-tetralone had passed into the aqueous phase. A second extraction of the organic layer with 20 ml. of ammonia under the same conditions removed another 8% of the α-naphthol but did not affect the α-tetralone content thereof.

It will be understood that various changes may be made in the parameters of the several techniques described hereinabove without departing from the scope of the present invention. Accordingly, the preceding description is intended as illustrative and should not be construed in a limiting sense.

The embodiments of the invention in which an exclusive privilege or property is claimed are defined as follows:

1. A process for the separation of α-naphthol from admixtures containing α-naphthol and α-tetralone which comprises contacting said admixture with a first extractant and a second extractant to form an aqueous phase comprising said first extractant and the bulk of said α-naphthol and an organic phase comprising said second extractant and the bulk of said α-tetralone, said first extractant comprising an aqueous solution of a nitrogen compound selected from the group consisting of ammonia and lower alkylamines having from 1 to 4 carbon atoms in their alkyl moieties, said second extractant comprising a low boiling, substantially saturated aliphatic hydrocarbon solvent; separating the organic phase from the aqueous phase; evaporating the nitrogen compound containing extractant from the aqueous phase to precipitate the α-naphthol therefrom; and recovering the precipitated α-naphthol from the aqueous phase.

2. The process of claim 1, wherein the aliphatic hyrocarbon solvent extractant is a petroleum fraction having a boiling point between 30° and 85° C., or a cycloaliphatic hydrocarbon having a boiling point of less than 125° C.

3. The process of claim 1, wherein the aliphatic hydrocarbon solvent extractant is a petroleum ether having a boiling point between 40° and 65° C.

4. The process of claim 1, wherein the aliphatic hydrocarbon solvent extractant is cyclohexane.

5. The process of claim 1, wherein the nitrogen compound extractant is aqueous ammonia.

6. The process of claim 1, wherein mixtures of α-naphthol and α-tetralone produced by dehydrogenation of α-tetralone and incorporating from 30% to 75% by weight α-naphthol are separated by countercurrent extraction with said first aqueous nitrogen compound-containing solution extractant and said second aliphatic hydrocarbon solvent extractant, the α-naphthol being substantially recovered in a first, aqueous phase containing said nitrogen compound-containing solution extractant and the α-tetralone being substantially recovered in a second, organic phase containing said aliphatic hydrocarbon solvent extractant.

7. A process for the separation of α-naphthol from admixtures containing α-naphthol and α-tetralone which comprises contacting said admixture with a first extractant comprising an aqueous solution of a nitrogen compound selected from the group consisting of ammonia and lower alkylamines having from 1 to 4 carbon atoms in their alkyl moieties to form an aqueous phase comprising said first extractant and the bulk of said α-naphthol and an organic phase comprising the bulk of said α-tetralone; separating the aqueous phase from the organic phase; contacting said organic phase with a second extractant comprising a low boiling, substantially saturated aliphatic hydrocarbon solvent to form an extract phase comprising said second extractant and the bulk of said α-tetralone and a raffinate phase comprising α-naphthol; separating said extract and raffinate phases; contacting said raffinate phase with additional first extractant to form additional quantities of said aqueous and organic phases; separating said additional aqueous and organic phases; combining said aqueous phases; evaporating the nitrogen compound containing extractant from said aqueous phase to precipitate the α-naphthol therefrom; and recovering the α-naphthol from the aqueous phase.

References Cited

UNITED STATES PATENTS

| | | | |
|---|---|---|---|
| 2,985,687 | 5/1961 | Thelin et al. | 260—621 A |
| 3,125,496 | 3/1964 | Thizy | 260—621 A X |
| 3,316,310 | 4/1967 | Pierrot et al. | 260—621 A |

HOWARD T. MARS, Primary Examiner

N. MORGENSTERN, Assistant Examiner

U.S. Cl. X.R.

260—590